United States Patent [19]
Suppa et al.

[11] 4,295,211
[45] Oct. 13, 1981

[54] INERTIALLY RELEASED JETTISONABLE AIRBORNE BUOY

[75] Inventors: Vito Suppa; Daniel Viallet, both of Paris, France

[73] Assignee: Thomson-CSF, Paris, France

[21] Appl. No.: 123,817

[22] Filed: Feb. 22, 1980

[30] Foreign Application Priority Data

Feb. 27, 1979 [FR] France ............................... 79 05002

[51] Int. Cl.[3] ............................................ H04B 1/59
[52] U.S. Cl. ....................................................... 367/4
[58] Field of Search ....................................... 367/3, 4

[56] References Cited

U.S. PATENT DOCUMENTS

| | | | |
|---|---|---|---|
| 3,646,505 | 2/1972 | Kirby | 367/4 |
| 3,889,224 | 6/1975 | Reed et al. | 367/3 |
| 4,186,374 | 1/1980 | Ouellette | 367/4 |

*Primary Examiner*—Richard A. Farley
*Attorney, Agent, or Firm*—Cushman, Darby & Cushman

[57] ABSTRACT

A radio buoy which can be jettisoned from an aircraft by a cable and which is intended to float on the surface of the ocean connected to a submerged hydrophone. During the drop a balloon is inflated by a forced intake of air through holes as a result of articulated openings in the form of scoops, the scoops unlocking by a bar the protective casing of the balloon and the safety device of the container, which is detached after impact with the water, the submerged container being linked with the electronics by a cable. The buoy can be used for underwater monitoring at depths up to 2,000 meters.

7 Claims, 5 Drawing Figures

INERTIALLY RELEASED JETTISONABLE AIRBORNE BUOY

BACKGROUND OF THE INVENTION

The present invention relates to buoys which can be dropped from an aircraft and more specifically to sound radio buoys which, when in the water, serve to provide a radio transmission of various underwater data and parameters detected by acoustic receivers. These radio buoys generally incorporate a float provided with an antenna as well as a hydrophone which, attached to the float descends to a certain depth to detect acoustic noise. The electrical signals from the hydrophone are processed and apply to the radio antenna.

The fall of the buoy after jettisoning must be decelerated and must be aerodynamically stable, so that after impact with the water buoyancy is ensured and the radio and acoustic systems are able to operate correctly.

It is known to use a balloon as a float, said balloon inflating during the fall and when it has reached the water the air is trapped in the balloon and ensures the buoyancy of the buoy.

Prior to the fall the balloon is contained within a casing, which must be detached at the start of the fall. Moreover, the lower part of the device contains a container in which there is the hydrophone with a cable drum. This cable serves to carry the hydrophone once submerged and to lead the electrical signals to the transmission antenna. After the buoy has reached the water the hydrophone and its cable must be detached from the float to descend to a depth determined by the length of the cable which has completely unwound.

A copending application of the present Applicant, Ser. No. 57422 filed July, 13 1979 describes a jettisonable airborne buoy construction incorporating a balloon which inflates during the fall, thus ensuring the buoyancy of the buoy on the water. The balloon inflates during the fall as a result of a forced entry of air into the bottom of the balloon, whilst within the balloon there is a membrane made from a flexible material which is able to seal the air inlet or outlet holes of the balloon, so that the pressure of the balloon is equal to the maximum dynamic pressure of air during the fall.

Articulated inwardly curved mechanical members called "scoops" permit the forced entry of air and the upper part of the balloon is provided with pockets, traversed by the air during the fall and these currents of air produce a pressure which stabilises the balloon in rotation during the said fall.

According to the prior art the casing is not fixed to the device and is detached at the start of the fall, which does not ensure a reliable operation, because said casing can cause damage. Furthermore in the prior art after impact on the water a trapdoor opens in the lower part of the buoy permitting the fall of the hydrophone with its cable. The trapdoor is opened by hydrostatic pressure. After release the cable drum and the hydrophone fall directly or are protected in a covering.

Descent is slow and therefore a considerable time elapses before the buoy is operational. Descent is faster if the drum is streamlined, but the volume available for the cable is reduced, which reduces the depth which can be attained by the hydrophone.

BRIEF SUMMARY OF THE INVENTION

According to the invention these problems are obviated by the movement of the scoops being used to free the casing and unlock a system for the detachment of the container in which is located the hydrophone and the cable drum, whilst the buoy also incorporates an inertial release device for detaching the container on impact with the water, said container descending rapidly into the water due to its fairing.

Moreover the device according to the invention has the advantage that the lower part is completely detached, making it possible to use a larger volume than in the prior art. It is therefore possible to house a cable length for depths up to 2,000 meters.

The main feature of the invention relates to a radio buoy incorporating a hydrophone which can jettisoned into the water from an aircraft and having two separable parts, an upper part containing the electronics associated with a transmission antenna and an actual hydrophone which detects sound waves in the water, and supporting a float balloon protected by a casing, said balloon inflating during the fall of the buoy by means of a forced air intake established by the raising of openings in the form of scoops located at the bottom of the balloon, a lower part or "diving apparatus" containing the hydrophone and its drum of wound suspension cable, whereby the hydrophone can be submerged at depths up to 2,000 meters, wherein the upper part of the buoy comprises mechanisms controlled by the raising of the scoops and which bring about the unlocking of the separable parts of said buoy.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
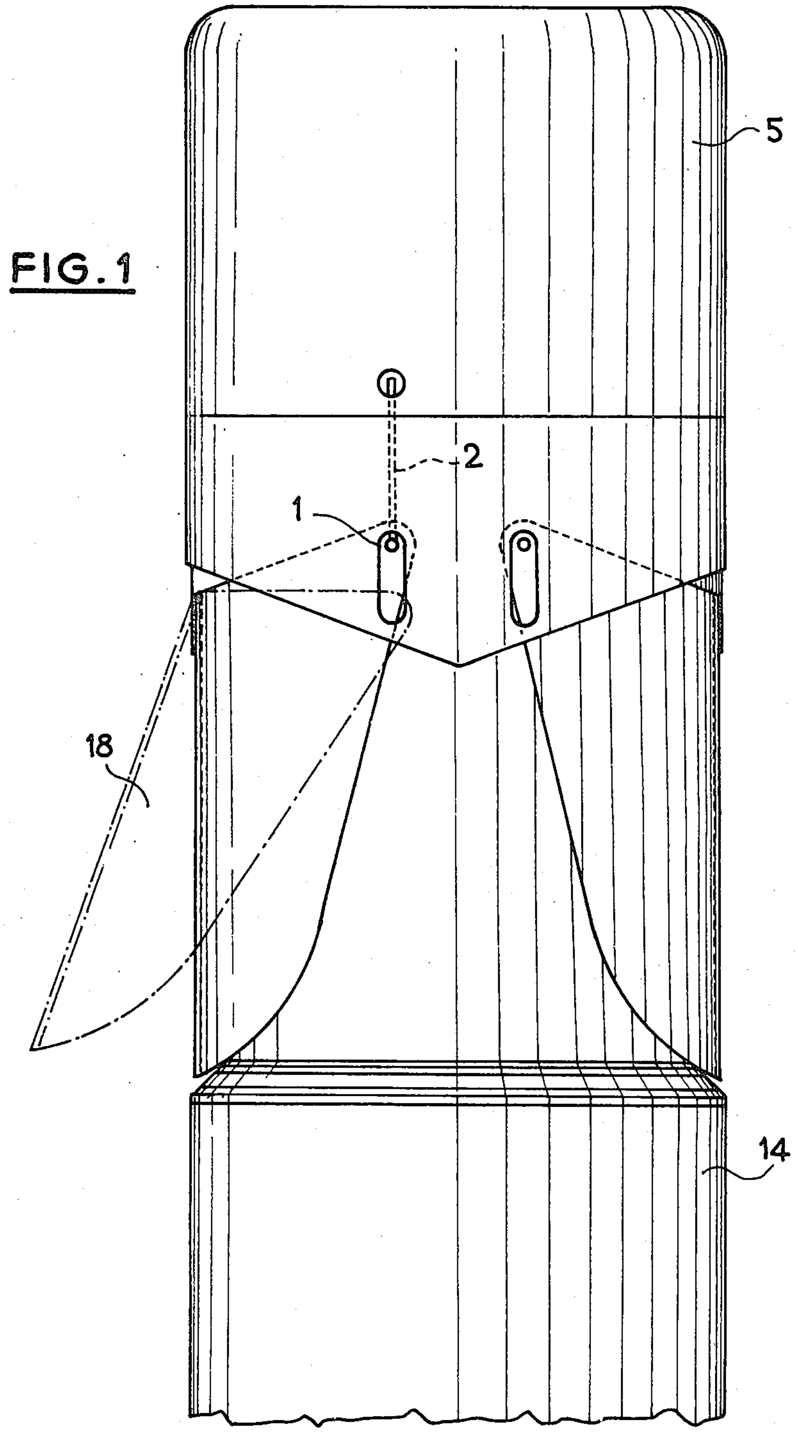
FIG. 1 a general view of the jettisonable buoy prior to dropping.

FIG. 1 is a general external view of the buoy according to the invention. On the buoy body are mounted the casing 5 which protects the balloon and the articulated scoops 18 permitting the forced inflation of the balloon. On said scoops are mounted by means of an attachment bars 2, whose function is to release the casing 5 and to unlock the safety mechanism of the container 14 containing the hydrophone and the cable drum. Hereinafter this container is called the diving apparatus.

Figure 2:
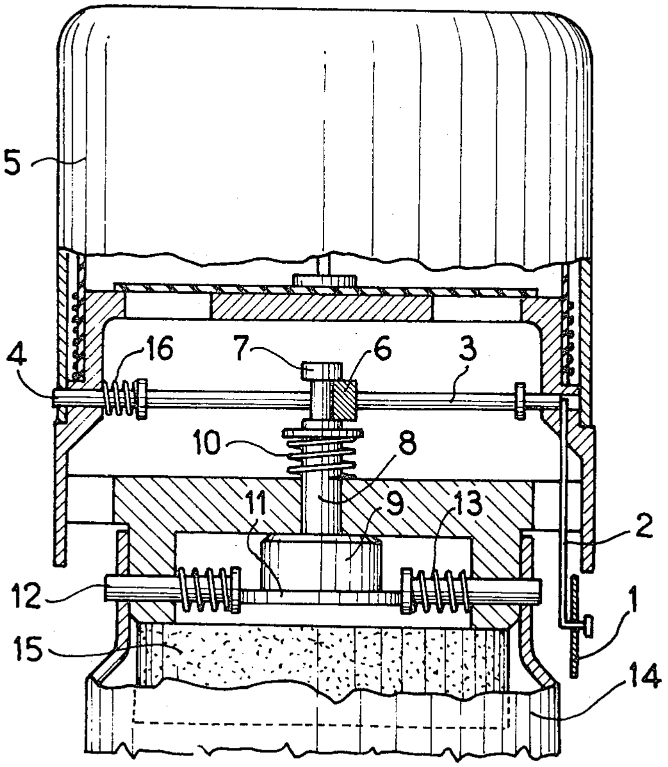
FIG. 2 a detailed longitudinal view of the devices for the release of the casing and the container prior to dropping.

FIG. 2 shows the device in the inoperative position prior to jettisoning of the buoy. According to the invention the forward tilting of the scoops during the jettisoning of the buoy on the one hand unlocks an inertia block 9 and on the other releases the protective casing 5.

FIG. 2 shows at 1 the upper end of the scoops permitting the entry of air into the balloon in accordance with the process indicated in the said copending application of the present Applicant and to which reference has been made hereinbefore. To each scoop is fixed, for example by riveting, the bar 2 which, with spring 16, locks a transversely positioned rod 3, whose end locks one side of the casing 5 and incorporating a member 6 which locks the end 7 of a shaft 8 fixed to block 9, whose base is provided with a disc 11 maintained in the raised position by a calibrated spring 10. This disc maintains the spacing between two rods 12 equipped with springs 13, whose ends lock the diving apparatus. Moreover, it is also possible to see at 15 the electronics, which essentially comprise the radio transmitter and the hydrophone amplifier.

As the buoy is, for example, dropped from an aircraft its fall brings about the raising of scoops 18 under the action of the air. By rotation of approximately 20° this raising leads to a descending movement of the bars 2 and by unlocking a displacement of the rods 3 under the action of spring 16. By the spacing apart of members 6 this displacement simultaneously causes the unlocking of shaft 8 and the release of the casing by overcoming ends 4.

Figure 3:
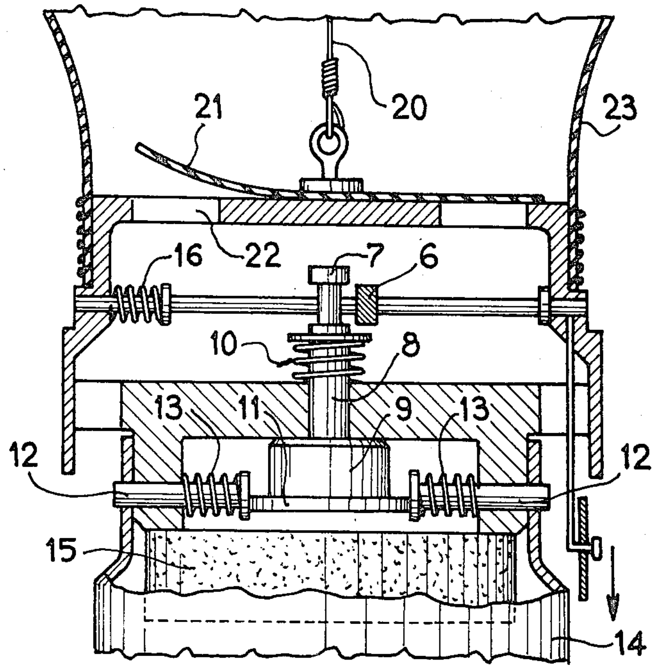
FIG. 3 a detailed longitudinal view of the devices for releasing the casing and container during the drop.

FIG. 3 shows the device in the state corresponding to the dropping of the buoy from an aircraft. With the casing released the balloon 23 inflates via holes 22, the air pressure having raised the membrane 21. The radio antenna 20 within balloon 23 is also shown in FIG. 3.

According to another feature of the invention the impact with the water is used for releasing the diving apparatus into the water. This impact causes a rapid downward movement of the block 9 due to its inertia and the disc 11 under the action of springs 13 permits the release of diving apparatus 14 by retracting rods 12, the disc being locked in the lower position.

Figure 4:
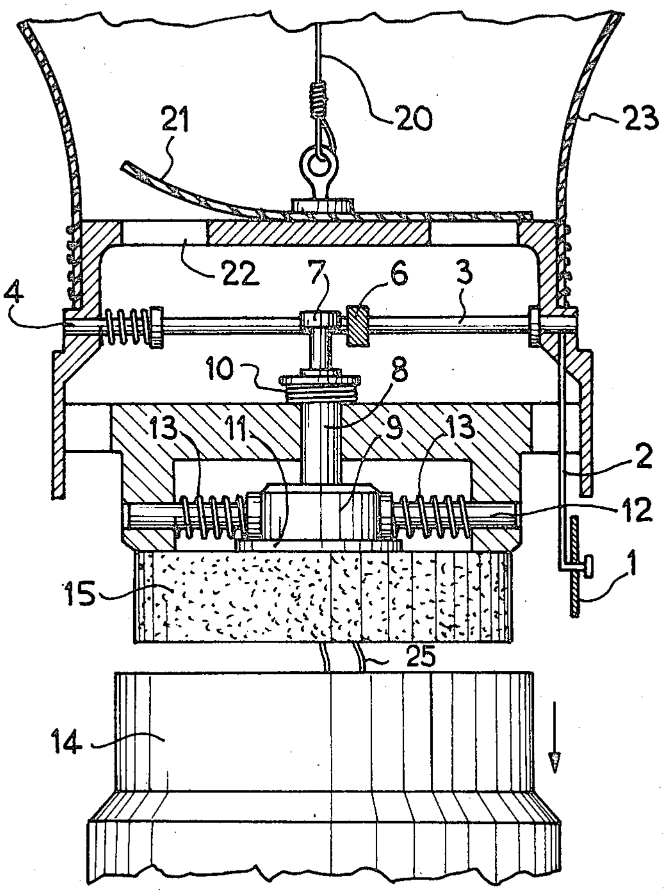
FIG. 4 a detailed longitudinal view of the devices for releasing the casing and the container after striking the water.
Figure 5:
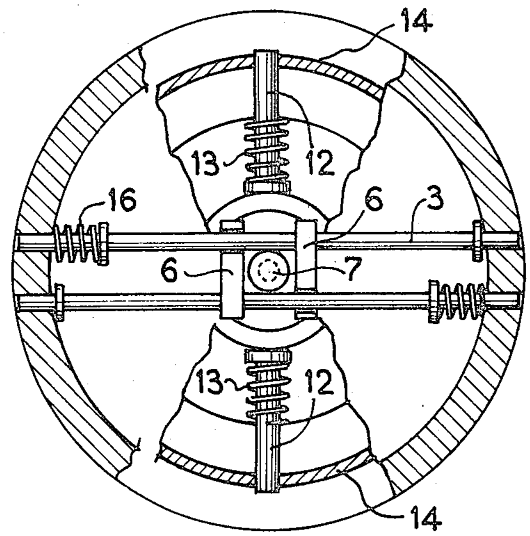
FIG. 5 a transverse view of the mechanisms for releasing the casing and the container.

FIG. 4 shows the device at the time of impact with the water and FIG. 5 is a transverse view giving a better understanding of its mechanisms.

After the impact the driving apparatus 14 is released and descends, because it is now only connected to the upper part of the buoy by cable 25. Since the connection with member 6 of shaft 8 is disengaged at the start of the fall at the moment of impact with the water the diving apparatus is released without the upper part being subject to severe stresses and strains. This obviates possible damage to the float and/or to the electronics which could result from stresses at the time of impact, particularly in the case of a very considerable cable length.

Moreover, as the covering of the diving apparatus has a more light-weight construction than the useful load constituted by the hydrophone and its drum, said load is streamlined by the covering, so that it descends more rapidly. The covering is lost by gravity when the cable is completely unwound.

In addition, the inertial release movement is inhibited during handling unless the scoops are raised, which prevents accidental impacts with the diving apparatus.

A jettisonable buoy incorporating a hydrophone which can be submerged to depths up to 2,000 meters has been described. Maximum security and protection are offered to the antenna, electronics and hydrophone during handling, drop and impact.

The invention is not limited to the embodiments described and represented hereinbefore and various modifications can be made thereto without passing beyond the scope of the invention.

We claim:

1. A radio buoy incorporating a hydrophone which can be jettisoned into the water from an aircraft and having two separate parts, an upper part containing a transmission antenna and the electronics associated therewith for transmitting the sound waves detected in water by the hydrophone, and supporting a float balloon protected by a casing, said balloon inflating during the fall of the buoy by means of a forced air intake established by the raising of openings in the form of scoops located at the bottom of the balloon, a lower diving part containing the hydrophone and its drum of wound suspension cable, whereby the hydrophone can be submerged at depths up to 2,000 meters, wherein the upper part of the buoy includes means operated by the raising of the scoops for unlocking the two separate parts of said buoy.

2. A jettisonable buoy according to claim 1, wherein said means, at the time of jettisoning, responds to the raising of the scoops to release the protective casing of the float balloon and to unlock the diving part from the upper part.

3. A jettisonable buoy according to claim 1, wherein at the time of impact with the water, said means causes the release of the diving part by inertia.

4. A jettisonable buoy according to claim 1, wherein the released diving part includes a container with a streamlined covering forming the lower part of the buoy, said covering dropping to the ocean floor once the suspension cable for the hydrophone is taut.

5. A jettisonable buoy according to claim 2, wherein said means includes bars fixed to the scoops, which control rods, one end of which locks one side of the casing.

6. A jettisonable buoy according to claim 5, wherein the rods also lock said diving part and during the drop raising of the scoops via the bars leads to the unlocking of the diving part.

7. A jettisonable buoy according to claim 3, wherein said means includes a block having in its lowerpart a disc which by pushing on other rods maintains the locking of the diving part during the drop and wherein after impact the advance of the block brings about the unlocking of the diving part.

* * * * *